United States Patent [19]

Godon

[11] Patent Number: 4,772,836

[45] Date of Patent: Sep. 20, 1988

[54] MOTORIZED ELECTRIC CONTROL DEVICE

[75] Inventor: Gérard Godon, Rueil-Malmaison, France

[73] Assignee: S.A.M.M. - Societe d'Applications des Machines Motrices, Bievres, France

[21] Appl. No.: 911,940

[22] Filed: Sep. 26, 1986

[30] Foreign Application Priority Data

Sep. 27, 1985 [FR] France ............................... 85 14391

[51] Int. Cl.⁴ ............................................ G05B 11/01

[52] U.S. Cl. ................................................ 318/675

[58] Field of Search ............................... 318/628, 675

[56] References Cited

U.S. PATENT DOCUMENTS

| | | | |
|---|---|---|---|
| 3,497,668 | 2/1970 | Hirsch | 340/222 |
| 3,644,816 | 2/1972 | Gilbert | 318/675 X |
| 4,054,825 | 10/1977 | Baxter | 318/675 X |
| 4,056,763 | 11/1977 | Debrie et al. | 318/675 |
| 4,471,280 | 9/1984 | Stack | 318/628 X |
| 4,510,574 | 4/1985 | Guittet et al. | 318/628 X |
| 4,531,080 | 7/1985 | Nordstrom et al. | 318/628 |
| 4,607,202 | 8/1986 | Koenig | 318/628 |
| 4,608,526 | 8/1986 | Martin et al. | 318/628 |

FOREIGN PATENT DOCUMENTS

| | | |
|---|---|---|
| 0023864 | 2/1981 | European Pat. Off. . |
| 2015326 | 3/1971 | Fed. Rep. of Germany . |
| 1967002 | 1/1976 | Fed. Rep. of Germany . |
| 3238048 | 4/1984 | Fed. Rep. of Germany . |
| 2484628 | 12/1981 | France . |

*Primary Examiner*—Bentsu Ro

*Attorney, Agent, or Firm*—Sughrue, Mion, Zinn, Macpeak, and Seas

[57] ABSTRACT

The present invention relates to a motorized electric control device provided with a joystick (14), characterized in that it comprises two electrtic torque motors (4, 5) whose axes of rotation are at right angles to one another, two forks (9, 10) coupled at one end to the respective torque motor shafts and offset relative to said shafts, the joystick being mounted for pivoting in relation to the point of intersection of the axes of rotation of the torque motors, resilient means for returning the joystick to a vertical position, rotary potentiometers (22) whose axis of rotation is fixed to the other ends of the forks (9, 10) and whose electric outputs constitute the control outputs of the device, and an electric circuit (30) connected to the outputs of the potentiometers and to the electric inputs of the torque motors in order to produce a resistant torque opposite and proportional to the inclination of the joystick (14) in the vertical position.

9 Claims, 3 Drawing Sheets

MOTORIZED ELECTRIC CONTROL DEVICE

The present invention relates to a motorized electric control device and to a control system comprising at least two control devices, one of which is operated manually and the other(s) is/are slaved to the first control device.

In tank turrets use is made at the present time of a mechanical connecting-rod linkage for operating the layer control device from a command control device. The resulting system is heavy and cumbersome, and is unsuitable for use in the confined space of a turret.

Furthermore, in weapons systems used in combat between aircraft or between tanks two operators are often necessary; a first operator, hereinafter called the "commander", has the task of locating and tracking the target (acquisition phase) by means of a wide-field sight, and the second operator, hereinafter called the "layer", attends to the finer tracking of the target with the aid of a high-magnification sight and to opening fire (firing phase). In order to follow the target in his sight, the commander imparts to the weapons a speed proportional to the angle of inclination of the joystick of his control device. It is important for the commander to be aware of the movement of his joystick (elevation and bearing) in relation to the normal reference position (joystick vertical), and that means should be provided for returning the joystick to that position. Finally, when the layer initiates the firing phase, if the joystick of his device is inclined at the same angle as that of the commander's device, the disturbance of weapon control when the change of operator is made will be minimized and fire will be opened more quickly.

For these control systems to be effective, light and small in size, it is necessary to have a compact arrangement with minimum play.

The invention seeks to provide a slaved control device and a slaved control system enabling the problems of the prior art to be solved.

It therefore relates to a motorized electric control device provided with a control joystick, characterized in that it comprises two electric torque motors which are mounted in a frame and whose axes of rotation are at right angles to one another, two forks coupled at one end to the respective torque motor shafts and offset relative to said shafts, the joystick passing through said forks and being mounted for pivoting in relation to the point of intersection of the axes of rotation of the torque motors; resilient means for returning the joystick to a vertical position; and an electric circuit connected to the outputs of potentiometers and to the electric inputs of the torque motors in order to produce a resistant torque of the torque motors proportional to their angular displacement relative to a determined position corresponding to the vertical position of the joystick.

The invention further relates to a control system characterized in that it comprises at least two motorized electric control devices, a first control device being intended to be operated manually, and in that the external control inputs of the other control device or devices are connected to the outputs of the rotary potentiometers of the first control device.

The invention will be better understood with the aid of the description given below by way of example and with reference to the accompanying drawings, in which.

Figure 1:
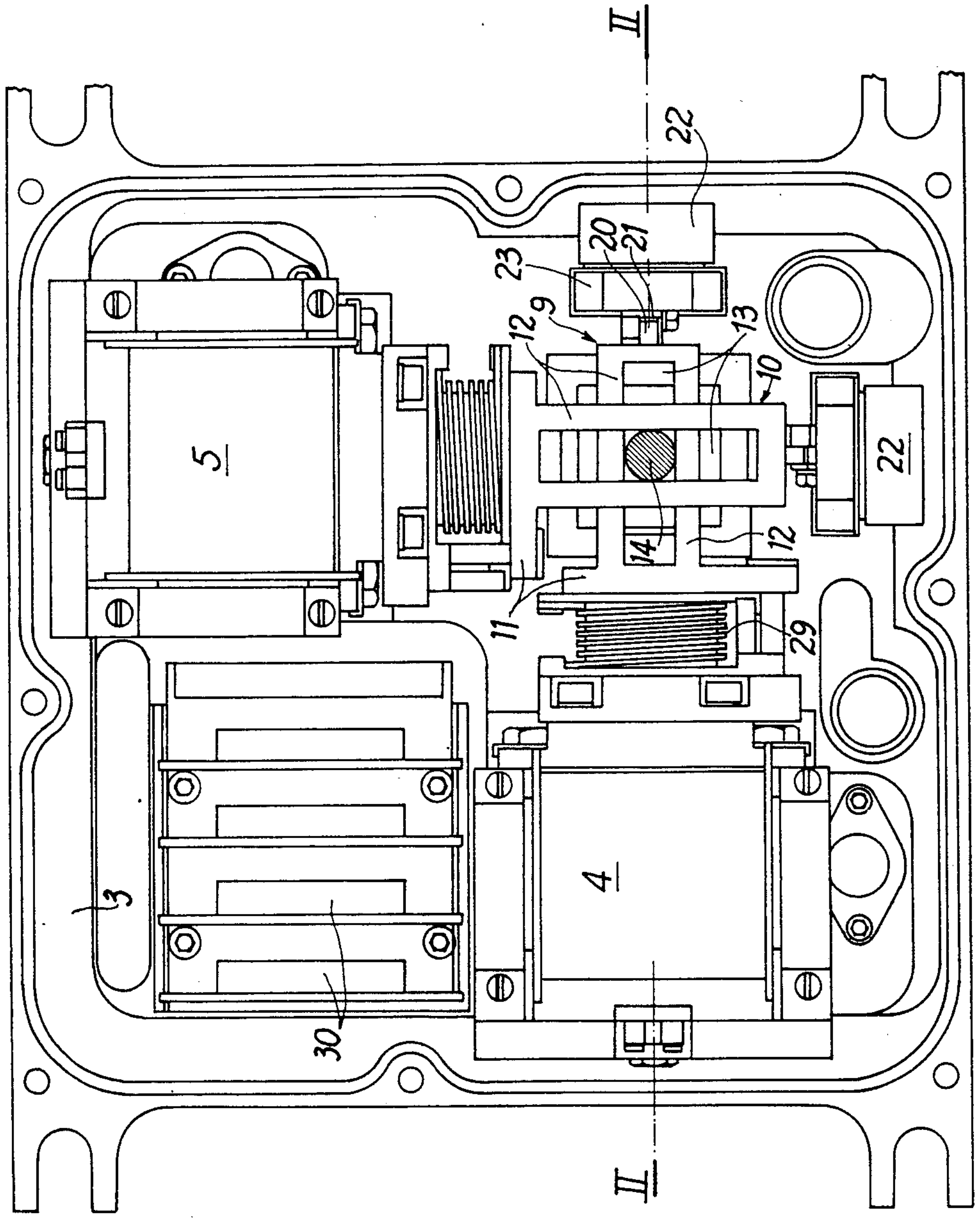
FIG. 1 is a top plan view, with the top cover removed, of a control device according to the invention.
Figures 2, 3:
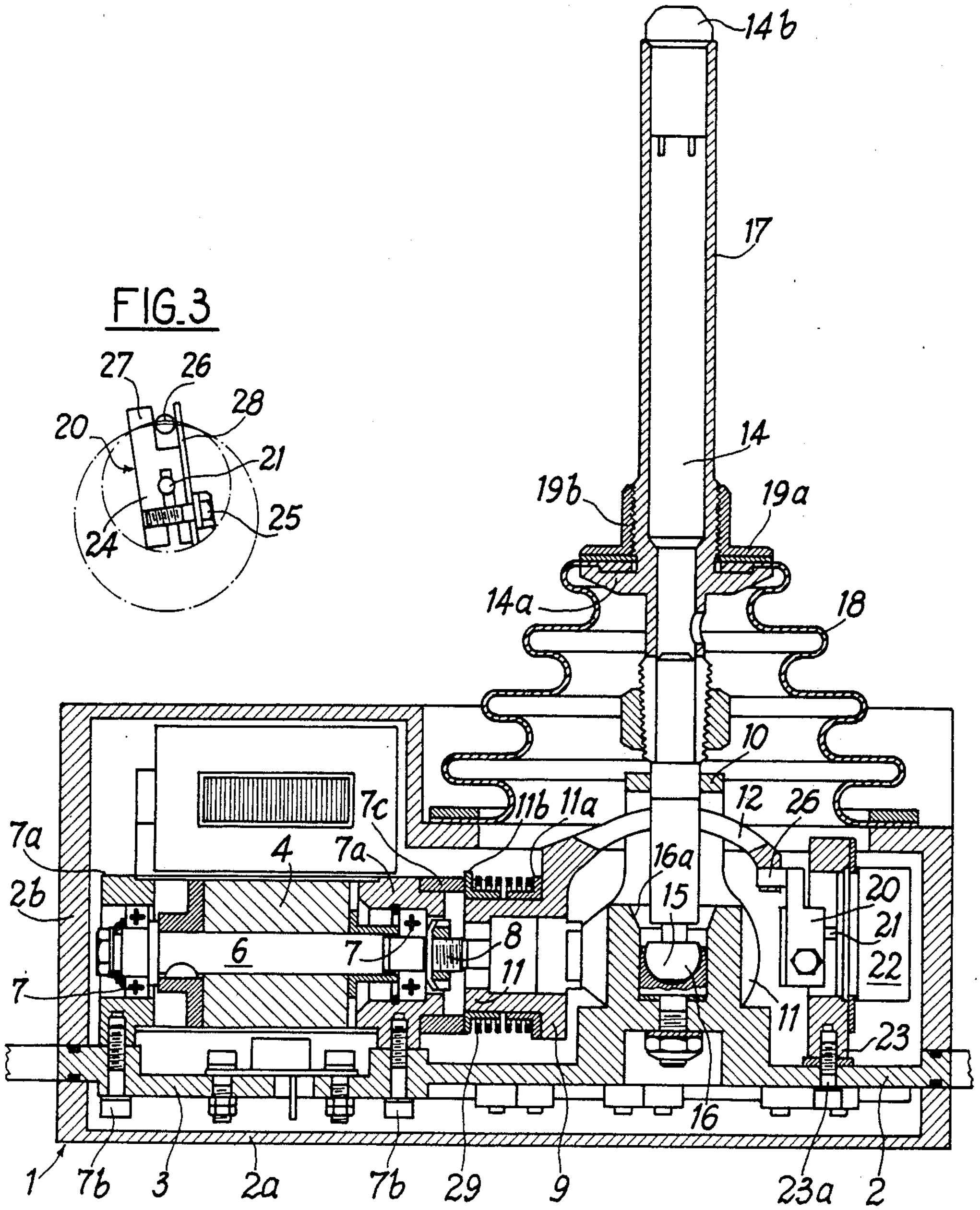
FIG. 2 is a view in section on the line II—II in FIG. 1.
FIG. 3 is a detail view of the coupling device between a potentiometer and a fork, as used in the control device shown, in FIG. 1.

The control device 1 shown in FIGS. 1 and 2 comprises a bottom cover 2*a* and a top cover 2*b*, which are fixed one on each side of a plate 3 forming a housing intended to receive the assembly of control means which is fixed to said plate.

Two electric torque motors 4 and 5 are fixed on the support plate 3 in such a manner that their shafts 6 are situated at right angles to one another in the horizontal plane (see FIG. 2). Each shaft 6 is mounted at each end in respective ball bearings 7 fixed on the support plate by fastening rings 7*a* and screws 7*b*, and is provided, at the end directed towards the point of intersection of the axes of the two shafts, with a conical-band coupling 8. This coupling is intended to permit connection free from play of each shaft end to a respective fork 9, 10. The forks 9 and 10 are each composed of a cylindrical part 11 intended to come into engagement with the conical-band coupling, and of an arcuate curvilinear part 12, which is offset relative to the associated motor shaft, the amplitude of the offset being different for each fork; the forks are each provided with a central slot 13 (FIG. 1) adapted to permit the passage of an operating joystick 14. The offset arrangement and the curvature (radii of curvature starting from the same centre) of the parts 12 are such that each of them can describe a rotational movement on each side of the vertical position in which the joystick 14 is shown. The joystick 14 is provided at its bottom end with a ball 15 mounted pivotally in a socket 16 formed in the support plate 3, in such a manner that the centre of the ball is situated at the point of intersection of the axes of the two torque motors. The support plate 3 has in the top part of the socket a widened-out shape at 16*a* for the purpose of limiting the angular movement of the joystick. The central part of the joystick 14 is composed of a widened portion 14*a*, on which a bellows 14 is gripped by means of a washer 19*a* and a collar 19*b* screwed onto the joystick. The bottom of the bellows 18 is fixed on the top cover 2*b*.

The ends of the curvilinear parts 12 are each connected by a connecting device 20 to the shaft 21 of a rotary potentiometer 22. The casing of the potentiometer 22 is fixed to the support plate 2 by means of a fastening ring 23 fixed at the bottom by a screw 23*a* passing through the support plate 3.

The connecting device 20 is shown in detail in FIG. 3. This device comprises a clamp 24 in which the shaft 21 of the corresponding potentiometer 22 is received and gripped therein with the aid of a screw 25. A stud 26 is disposed between a projecting part 27 of the clamp and a resilient plate 28 facing the projecting part 27 and fixed on one side of the clamp by the screw 25. This stud 26 is engaged at its other end in a hole formed in the end of the corresponding fork 9 or 10. The axis of each potentiometer 22 is offset in the upward direction in relation to the axis of the shaft 6 carrying the fork 9 or 10, so that a rotation of 20° of the shaft on one side or the other of the position of rest entails a rotation of the potentiometer axis of about 30° in the same direction of rotation and permits a sufficiently accurate measurement of the rotation of the fork through voltage variation.

As can be seen in FIG. 2, the joystick 14 is provided at its top end with a pushbutton 14*b* which is used in a control system and the function of which will be described with reference to FIG. 4. A spring 29, which returns the fork to a position corresponding to a vertical position of the joystick 14 when there is no current in the device, is fixed by one end on a first sleeve 11*a* fastened to the cylindrical portion 11 of the fork 9 or 10, and by its other end to a second sleeve 11*b* surrounding a section of the cylindrical portion 11 and fastened by means of an annular brace 7*c* to the fastening ring 7*a* of the ball bearing 7 situated at the fork (9 or 10) end. The potentiometers and the torque motor inputs are connected electrically to an electric circuit 30, the configuration and functions of which will likewise be described in detail with reference to FIG. 4.

When the joystick pivots about its ball 15 in a control device of this kind, the forks 9 and 10 turn simultaneously or separately about the axes of the torque motors, thus giving rise to the simultaneous rotation of the associated torque motor and potentiometer shafts. Each motor is connected to the centre point of the corresponding potentiometer, whose end terminals are connected to a voltage source (not shown) by way of an electric circuit (not shown), in such a manner that said torque motors receive a current which creates a resistant torque opposite and directly proportional to their angular displacement in relation to a determined position corresponding to the vertical position of the joystick. This proportionality relationship enables the operator to take note of the magnitude of the pivoting movement of the joystick in relation to its vertical reference position. The resistant torque also enables the joystick to be returned to a vertical position, the torsion springs 29 entailing an automatic return of the joystick to its vertical position in the absence of current in the device.

A control device of this kind may also be slaved to an electric remote control device by applying to the torque motors of that control device, by way of the electric circuit 30, an electric current signal corresponding to a desired displacment of the joystick. A system of this kind may be applied to training functions in order to permit the simulation of an acquisition phase and/or a firing phase in pilot and gunner training schools.

Figure 4:
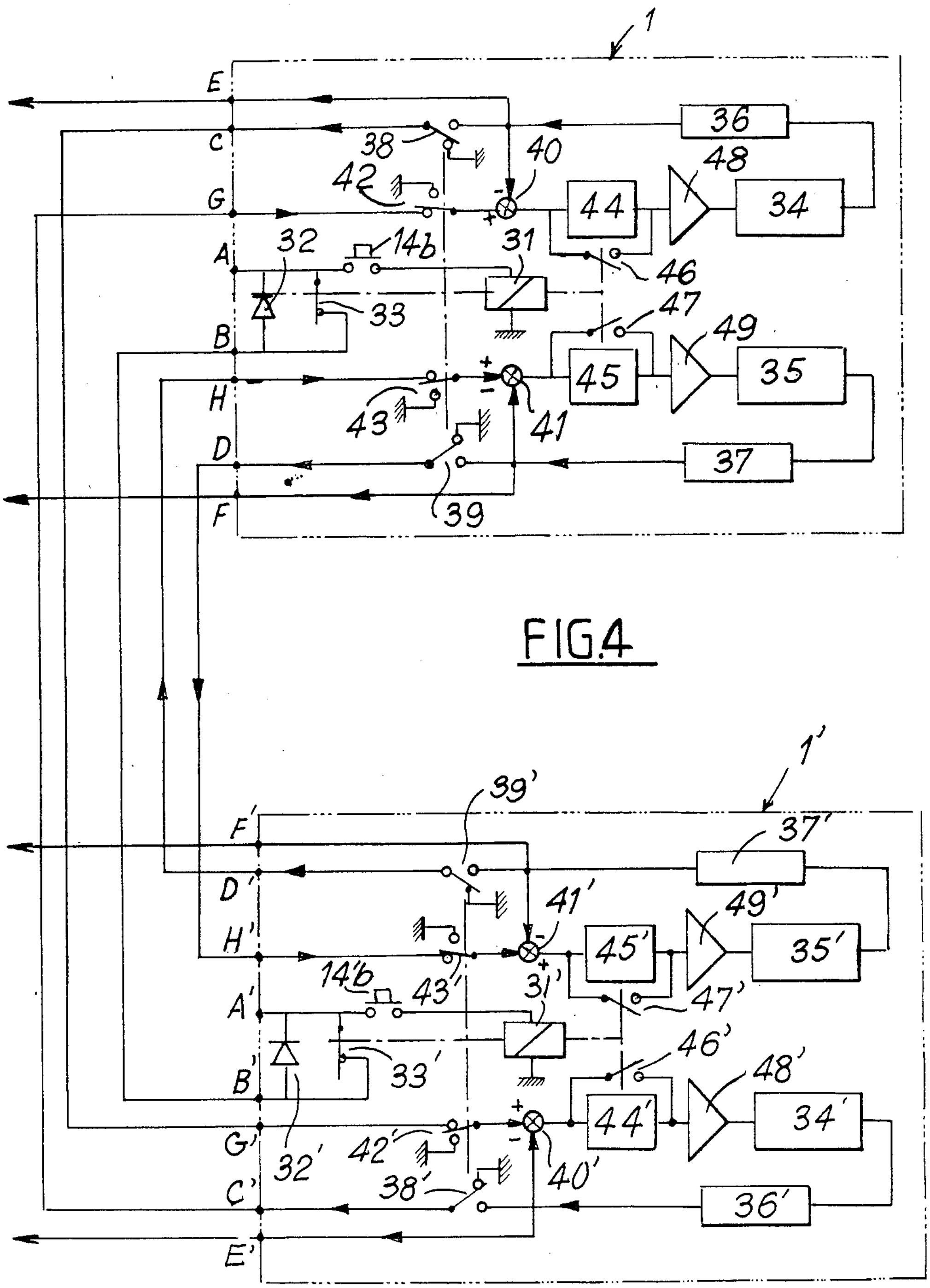
FIG. 4 is a block diagram of a control system comprising two control devices according to the invention.

FIG. 4 is a block diagram of a control system comprising two control devices 1 and 1' of the type described above, the first control device 1 being intended to be operated manually by an operator, and the second 1' being connected electrically to the first device in such a manner as to be slaved to the operation of the latter. These first and second control devices will hereinafter be referred to respectively as "command or master contol device" and "layer or slave control device". In order to simplify manufacture, to reduce costs, and to permit a wide range of use, these control devices are identical, so that only the structure of the control device 1 will be described below, the components of the control device 1' corresponding to those of the device 1 being given the same reference numerals with the addition of a prime.

The control device 1 contains a relay 31 connected to earth or ground on the one hand and to one of the terminals of the pushbutton 14*b* on the other hand. The other terminal of the pushbutton 14*b* is connected to a first output terminal A of the control device, this terminal being intended to be connected to a 27-volt supply source (not shown). A diode 32 is connected by its cathode to the terminal A and by its anode to an output terminal B. A first closed contact 33 is connected between the terminals A and B. Each of the motors 34 and 35 is connected to a potentiometer 36 and 37 respectively by the mechanical connection described in connection with FIGS. 1 to 3 and illustrated schematically in FIG. 4. The outputs of the potentiometers 36 and 37 are connected respectively to terminals of two change-over switches 38 and 39, whose centre terminals are connected respectively to outputs C and D of the control device, the third terminal being connected to earth or ground. The outputs of the potentiometers 36 and 37 are likewise connected to output terminals E and F of the control device on the one hand, and to the negative inputs of two subtracter circuits 40 and 41, on the other hand. The positive inputs of the circuits 40 and 41 are connected respectively to the centre terminals of two change-over switches 42 and 43, whose other terminals are connected respectively to an input terminal G of the device and to earth, and to an input terminal H of the device and to earth. The terminals C and D constitute the slave output terminals, the terminals E and F constitute the output control terminals, and the terminals G and H constitute the slave input terminals of the control device. The outputs of the two subtracters 40 and 41 are connected respectively to filter and amplifier circuits 44 and 45, to which are respectively connected in parallel two open contacts 46 and 47. The outputs of the filter circuits 44 and 45 are respectively connected to inputs of two amplifier circuits 48 and 49, whose outputs are connected respectively to the input terminals of the torque motors 34 and 35. The contacts 33, 46 and 47 and the change-over switches 38, 39 , 42 and 43 are all controlled by the relay 31 and, when the relay is not energized, are in the positions shown in FIG. 4. The two control devices 1 and 1' are connected together by the following connections: B-B', C-G', D-H''' C'-G and D'-H. The input terminal A is fed with direct voltage of 27 volts, unlike the terminal A', for the reason that in the example illustrated the control device 1 is the command device, while the control device 1' is the layer device. The connections D'-H and C'-G exist only for cases where the control device 1' becomes the command device, the +27 volt supply source being connected to the input terminal A', or for changing over to the firing phase, as will be explained in connection with the operation of the system. The output control terminals E, F and E', F' are intended respectively for connection to the units (not shown) which have to be controlled by the control devices 1 and 1'. The electric circuit 30 mentioned in connection with FIG. 1 contains the components 31 to 33 and 38 to 49.

In the course of combat between aircraft or between tanks, the commander or pilot operates the button 14*b* to operate direction controls (for an aircraft elevation and bearing controls) with the aid of the joystick 14 and the control device 1. When the pushbutton 14*b* is operated, the relay 31 is energized with the 27-volt supply voltage, and the contacts 33, 46, 47 and the change-over switches 38, 39, 42 and 43 switch over. The positive inputs of the subtracter circuits 40 and 41 are grounded by the change-over switches 42 and 43, and the filters 44 and 45 are short-circuited by the contacts 46 and 47. The potentiometers 36, 37, 36', 37', the filters 44, 45 and 44', 45' and the amplifiers 48, 49 and 48', 49' being fed by +15 volt and +27 volt supplies (not shown), the change-over switches 38 and 39 make it possible to transmit to the layer's or gunner's control device 1', through the slave output terminals G' and H' and the slave input terminals H' and G', elevation and bearing slave signals from the outputs of the potentiometers 36 and 37. As the output A' is not connected to the 27 volt supply and as the contact 33 is open, the relay 31' cannot be energized even by the operation of the pushbutton 14'b, so that it is impossible to transmit slave signals from the control device 1' to the commander's control device 1. The contacts and change-over switches of the firer's control device 1' thus remain in the position shown in FIG. 4.

During the operation of the pushbutton 14b, the manipulation of the joystick 14 on the axes of the motors, separately or simultaneously, brings about the turning of the torque motors 34 and 35 and, with the aid of the forks 9 and 10 and of the connecting device 20, the turning of the rotary elevation potentiometer 36 and bearing potentiometer 37. The positive inputs of the subtracter circuits 40 and 41 being grounded and the filters 44 and 45 being short-circuited, there is obtained at their output a negative signal whose amplitude is that of the output control signal of the potentiometers 36 and 37 respectively. The motors 34 and 35 thus receive, by way of the amplifiers 45 and 46 respectively, a current creating a resistant torque opposite and directly proportional to the inclinations of the joystick on the respective axes 6.

The slave signals applied to the inputs G' and H' of the control device 1' are transmitted via the change-over switches 42' and 43' to the positive inputs of the subtracter circuits 40' and 41'. The circuits 40' and 41' respectively effect the subtraction of these slave signals and of the output signals of the elevation potentiometer 37' and bearing potentiometer 36' respectively. The output signals of these subtracter circuits 40' and 41' are respectively applied to the torque motors 34' and 35' by way of the circuits 44' and 45' and of the amplifiers 48' and 49' respectively. The application of this signal entails the turning of the motors, the forks, and the potentiometers, and the pivoting of the joystick in dependence on the turning of the forks. When the output signals of the potentiometers 36' and 37' reach the value of the input slave signals, that is to say when the output voltage of the subtracters becomes zero, the torque motors 34' and 35' are no longer fed and no longer turn, holding the joystick in a position representing the input slave signals and therefore identical to the position of the joystick of the control device 1. The circuits 44' and 45' and the amplifiers 48' and 49' provide a loop gain sufficient to permit the necessary accuracy and stability of the position of the joystick 14' in relation to that of the joystick 14.

With a control system of this kind the commander can therefore operate his control device by pressing the operating pushbutton 14b, and can transmit control signals to direction units and slave signals to the firer's control device 1' via his control joystick. The commander feels on his own joystick a force proportional to the pivoting angle of the joystick on the axes of the motors, and he brings about a movement of the joystick 14' of the layer's control device in identical fashion to that of his own joystick 14. During this operation the operating pushbutton 14'b of the layer's control device has no effect on the commander's control device. Because of the substantial loop gain obtained with the aid of the circuits 44', 45' and of the amplifiers 48' and 49', as soon as the layer makes a small movement of his joystick in relation to the position imposed by the control device 1 he feels the full resistant force of the torque motors, and thus realizes that he is being guided by the commander. If the commander releases the pushbutton 14b, the input control signals H' and G' become zero and the joystick 14' of the control device 1' returns to its vertical position through the action of the return springs 29' (not shown). The firer's control device 1' is thus always in the optimum firing position when the commander engages combat or pursuit by acting on his control joystick 14 and operating the pushbutton 14b.

In FIG. 4 the elevation and bearing control paths are reversed in the control devices 1 and 1' in order to simplify the representation of the connections between these two devices, but it is obvious that these devices can be manufactured in identical manner. Thus, it is possible to use each of the devices indiscriminately as commander's or firer's control device by connecting the 27 volt supply to the input terminal A or A', the other connections remaining unchanged. In either case the control outputs E and F of the commander's control device and the control output terminals E' and F' of the firer's control device are connected to the direction means of the system being controlled.

For the remote control operation of a control device 1 or 1' it is sufficient to connect the slave input terminals G and H or G' and H' to any external electric control device.

When the firing phase has to be carried out, the commander announces this to the layer, who takes control of his joystick 14'. The commander then releases the pushbutton 14b, thus enabling the layer to take over the system, with the aid of the circuit 33 and the diode 32', by operating his pushbutton 14b. The slave control device 1' then becomes the master control device and slaves the control device 1, which nevertheless retains overriding control of the system through the operation of the pushbutton 14b. When the firing phase is completed, the commander can thus take over the system with his joystick 14 in the correct position, so that the transfer of control is accelerated and made more secure.

The assembly comprising the forks 9, 10 and the conical-band couplings has been indicated solely as a non-limitative example. The forks 9, 10 constitute means converting the rotary movement of the shafts 6 of the torque motors 4, 5 into a pivoting movement of the control joystick 14, and vice versa, and may be replaced by any appropriate equivalent means.

I claim:

1. A control system including a motorized electric control device, said motorized electric control device comprising: a pair of electric torque motors (4, 5; 34, 35), each of said torque motors having a respective shaft, and each of said shafts having an axis of rotation which is perpendicular to the other, thereby forming a point of intersection between the axes of said shafts; a pair of forks (9, 10), each of said forks being coupled at one end thereof to a different one of said shafts, and each of said forks being disposed offset relative to its associated shaft; a joystick (14) mounted such that it passes through said forks and such that it pivots in relation to the point of intersection of the axes of rotation of the shafts; resilient means (29) for returning the joystick to a vertical position; a pair of rotary potentiometers (22; 36, 37), each of said forks being coupled at the other end thereof to a different one of said potentiometers; and an electric circuit (30) connected to the potentiometers and to the electric torque motors such that said torque motors receive a current which creates a resistant torque opposite and directly proportional to their angular displacement relative to the vertical position of said joystick (14).

2. A control system as claimed in claim 1, wherein each shaft (6) is coupled to the associated fork by means of a conical-band coupling (8).

3. A control system as claimed in claim 1 or 2, wherein the forks (9, 10) are curvilinear and their radii of curvature start from the same center.

4. A control system according to claim 1 or 2, further comprising slave input terminals and wherein the electric circuit (30) contains two subtracter elements (40, 41) having negative inputs which are connected respectively to the rotary potentiometers (36, 37) and having positive inputs which are connected to the slave input terminals (G, H) to effect a rotation of the torque motors (34, 35) proportional to external control signals.

5. A control system according to claim 1, further comprises at least a second identical motorized electric control device, the first control device (1) being supplied with voltage and being operated manually, and the second control device having slave inputs (G', H') which are connected to the rotary potentiometers (36, 37) of the first control device.

6. A control system as claimed in claim 5, wherein the electric circuit (30) of each control device (1, 1') contains an operating relay (31, 31') connected in series to an operating pushbutton (**14*b*, 14*b*'), said pushbutton being disposed at the top end of the joystick (14**) and being operable for energizing the relay in response to a voltage signal thereby allowing the transmission of slave signals to the second control device and being operable for inhibiting the supply of voltage to from the second control device to the first control device.

7. A control system as claimed in claim 6, wherein the electric circuit (30) of each control device (1 and 1') contains amplification means (48, 49, 48', 49') and subtracter elements, said amplification means being connected between the subtracter elements and the torque motors and being operable for supplying a resistant torque to the torque motors, the resistant torque being opposite and proportional to the movements of the joystick.

8. A control system as claimed in one of claims 6 or 7, wherein the electric circuit (30) of each control device (1, 1') contains a diode (32, 32') connected to the operating pushbutton (**14*b*, 14*b*'**) such that one of the devices supplied with voltage controls the device which is not supplied with voltage in response to the release of the pushbutton of the device supplied with voltage, and to the operation of the pushbutton of the device not supplied with voltage.

9. A control system as claimed in claim 8, wherein the electric circuit (30) of each control device (1, 1') contains a filter and amplifier circuit (44, 45, 44', 45') connected in series to the amplification means (48, 49, 48', 49') when the operating relay is in the unenergized state.

* * * * *